United States Patent [19]

Dimmer et al.

[11] E Patent Number: Re. 31,746

[45] Reissued Date of Patent: Nov. 27, 1984

[54] ROLL-UP TARP FOR TRAILERS

[75] Inventors: Jerry R. Dimmer, Mooreton; William J. Shorma, Wahpeton, both of N. Dak.

[73] Assignee: Wahpeton Canvas Company, Inc., Fargo, N. Dak.

[21] Appl. No.: 416,116

[22] Filed: Sep. 9, 1982

Related U.S. Patent Documents

Reissue of:

[64] Patent No.: 4,302,043
Issued: Nov. 24, 1981
Appl. No.: 142,373
Filed: Apr. 18, 1980

[51] Int. Cl.[3] ..... B60J 11/00

[52] U.S. Cl. ..... 296/98; 135/87

[58] Field of Search ..... 296/98, 100; 135/5 A, 135/5 AT; 160/238, 309

[56] References Cited

U.S. PATENT DOCUMENTS

| | | | |
|---|---|---|---|
| 473,292 | 4/1892 | Campbell | 296/98 |
| 481,954 | 9/1892 | Jewel | 52/63 |
| 808,693 | 1/1906 | Schutte | 374/37 |
| 1,740,190 | 12/1929 | Martin | 160/309 |
| 2,562,300 | 7/1951 | Dingman | 296/98 |
| 2,815,179 | 12/1957 | Keljik | 160/309 |
| 2,976,082 | 3/1961 | Dahlman | 296/38 |
| 3,292,971 | 12/1966 | Zucker | 160/309 |
| 3,330,225 | 7/1967 | Barry | 105/377 |
| 3,384,413 | 5/1968 | Sargent | 296/98 |
| 3,397,009 | 8/1968 | Landenberger | 296/100 |
| 3,423,126 | 11/1969 | Galvin | 296/98 |
| 3,498,666 | 3/1970 | Harrawood | 296/100 |
| 3,499,680 | 3/1970 | Stroebel | 296/98 |
| 3,756,650 | 9/1973 | Michel | 296/137 C |
| 3,785,694 | 1/1974 | Sargent | 296/98 |
| 3,829,154 | 8/1974 | Becknell | 296/100 |
| 3,848,653 | 11/1974 | Youngs | 160/238 |
| 3,854,770 | 12/1974 | Grise et al. | 296/100 |
| 3,901,548 | 8/1975 | Seaman, Jr. | 296/10 |
| 3,942,830 | 3/1976 | Woodard | 296/100 |
| 4,030,780 | 6/1977 | Petretti | 296/100 |
| 4,212,492 | 7/1980 | Johnsen | 296/98 |
| 4,225,175 | 9/1980 | Fredin | 296/98 |

FOREIGN PATENT DOCUMENTS

| | | | |
|---|---|---|---|
| 0488649 | 12/1952 | Canada . | |
| 1132168 | 9/1982 | Canada | 296/77 |

*Primary Examiner*—Bruce H. Stoner, Jr.
*Assistant Examiner*—John A. Carroll
*Attorney, Agent, or Firm*—McDougall, Hersh & Scott

[57] ABSTRACT

A canvas tarpaulin having dimensions sufficient to cover the top of an open truck box has one edge affixed to one longitudinal edge of the truck box top. The opposite edge of the tarpaulin is affixed to a tube which extends for the length of the box. The rear of the tube contains an extension attached to a universal joint. A crank handle is also attached to the joint so that the tube can be rolled transversely across the top to roll up the tarpaulin thereon. A downward cantilevered lip is attached to the opposite longitudinal edge of the box top. When the tarp is unrolled, the tube rolls over a free edge of the lip and can be wound in the opposite direction rolling up a small portion of the tarpaulin under the free edge. The crank handle is then moved against the rear of the truck body thus locking the universal joint thereby holding the tarp tightly upon the box top. The crank handle is then secured against the rear of the box.

32 Claims, 11 Drawing Figures

10
12
14
16
28
34
36
46
48
50
52
58
60
62
64
66
68
70
72
76
77
78
82
84
7

ROLL-UP TARP FOR TRAILERS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to removable covers for open top trucks or trailers.

2. Discussion of Related Art

Various types of truck and trailer bodies are designed to be loaded through an open top, This creates the necessity for a cover which can easily be attached to the open top to inhibit the free flow of material out of the truck or trailer body during high speed movement thereof. Attributes of such a covering should include ease of deployment and removal as well as a secure means of attaching the covering to the body itself to insure the covering will remain in place and intact.

Several coverings for open containers have been suggested. For instance, U.S. Pat. No. 3,397,009 shows a tarp covering which can be deployed or removed by use of a roller extending transversely of the truck or trailer body. The roller is attached to the tarp at the middle and will travel with the tarp as it is rolled for completely enrolling the tarp and when completely rolled the entire top of the truck or trailer is clear of the tarp. U.S. Pat. No. 3,498,666 shows a roll up load cover apparatus havng a forward mounted crank operated roller rod held in an open back box frame. One end of a cover is secured to the rod and the other end is secured to the lateral midportion of a swinging U-shaped frame, whose side arms are mounted on a pivot near the middle of the body of the truck or trailer. As the cover is unrolled from the rod, tension springs lift the swinging frame forward and aft over center. U.S. Pat. No. 3,854,770, issued Dec. 17, 1974 to Grise, shows a truck cover having a rotary shaft extending transversely of the truck container adjacent one end thereof. The cover is rolled about the shaft. A bow having a pair of side members is pivotally mounted to the sides of the container intermediate the ends thereof. The bow includes a cross member parallel to the shaft. The leading end of the cover is attached to the bow so that pivotal movement of the bow is effective to unwind the cover from the shaft. U.S. Pat. No. 4,030,780, issued June 21, 1977 to Petretti, shows a cover assembly for an open body having a flexible cover of which one end is anchored to one end of the open body. The second end of the cover is attached to a rotatable rod. The rod is mounted on an arm pivoted to the body and capable of being swung back and forth along the side of the body whereby movement of the arm and thus the rod from one position to the other will cause the cover to be wound or unwound from the rod.

SUMMARY OF THE INVENTION

One object of the present invention is to provide a covering for an open body which covering can easily be moved between a stored and covering position on the body by a single person with a minimum of effort.

A further object of the present invention is to provide a covering for an open body which covering can be secured over the body without the use of straps, buckles or other devices which consume a great deal of time to secure.

An even still further object of the present invention is to provide a covering for an open body which is relatively simple in construction and yet provides a safe and secure mechanism for performing its intended function.

An additional further object of this present invention is to provide a covering for an open body which can be secured to existing body structures such as trailers, trucks or the like.

In accordance with the above objects, the device of the present invention includes a flexible covering material such as canvas which is secured along one longitudinal edge to one longitudinal edge of the open top of the body to be covered. The opposite edge of the material is secured to a tube upon which the material can be rolled. Runners are provided transversely across the open body top for supporting the material and providing a surface to support the tube when the covering is being rolled up or deployed. One end of the tube contains an extension having a universal joint disposed thereon. The universal joint is attached to a crank handle which extends to a position operable from ground level. The universal joint is disposed so that it extends slightly to the rear of the body and therefore the crank handle can be moved to a position perpendicular to the tube thus locking the universal joint at a given position. A retainer assembly is attached to the rear of the body to hold the handle in this perpendicular position. In order to secure the tarp to the top of the body, a lip extends laterally from the side of the body to which the tarp is not secured. The lip projects slightly downward and when the tarp is unrolled, the tube is unrolled over the lip. Continued rolling of the tube causes the tarp to be rolled thereon in a reverse direction and the tube moves beneath the lip. Once the tube is secured beneath the lip, the crank handle is positioned perpendicular to the tube and the tarp is locked in position. In this manner, the tarp can be tightened to the desired degree by continuing rolling the [rolling the] tube beneath the lip.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figures 1, 6, 7, 11:
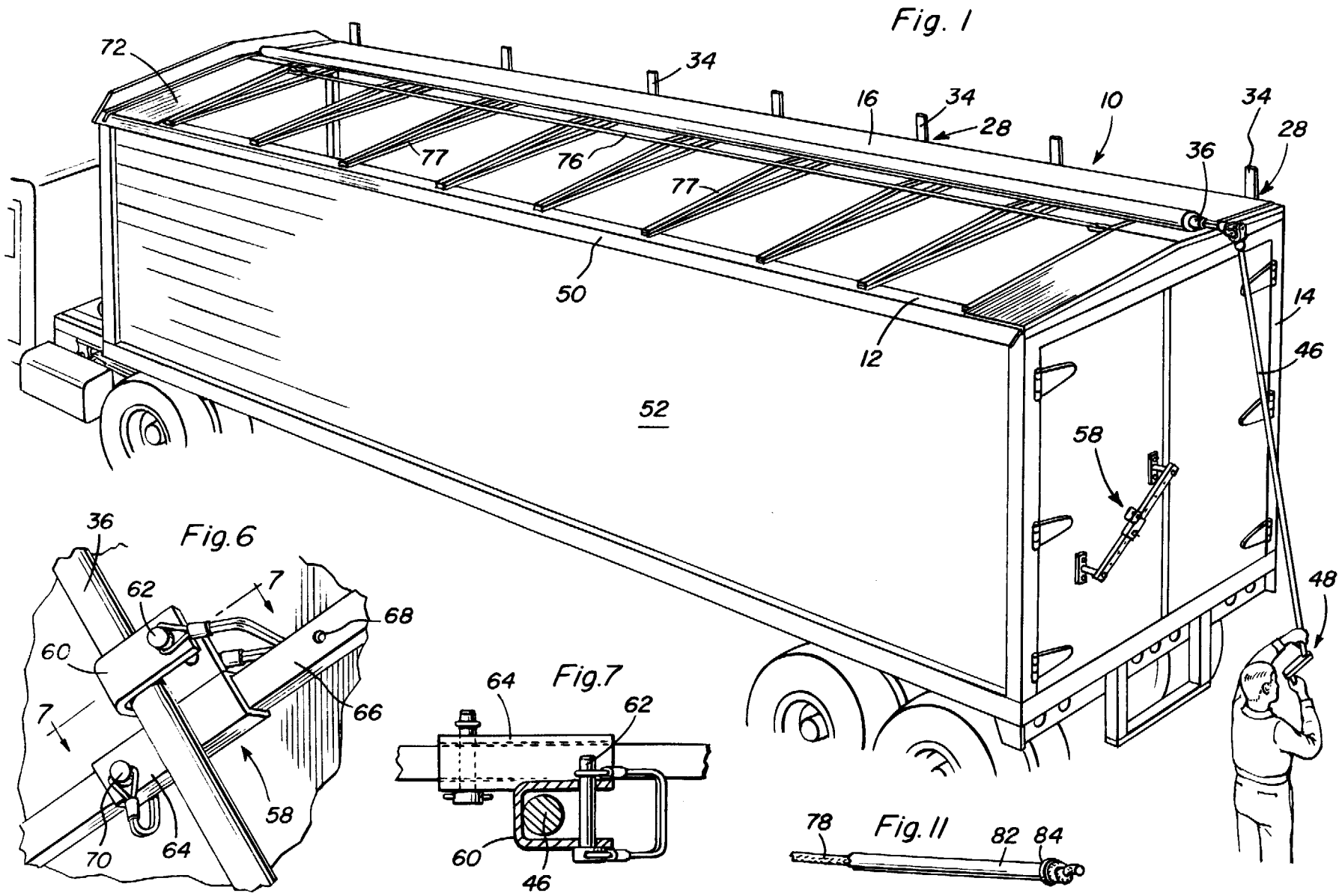
FIG. 1 is a perspective view of a truck trailer using a roll up tarp of the present invention.
FIG. 6 is an enlarged view of the latching mechanism of the invention.
FIG. 7 is a transverse sectional view taken substantiall along a plane passing through section line 7—7 of FIG. 6.
FIG. 11 is a detailed view showing the interconnection of the stretch cord.

Now with reference to the drawings, a roll-up tarp incorporating the principles and concepts of the present invention and generally referred to the reference numeral 10 will be described in detail.

Figure 2:
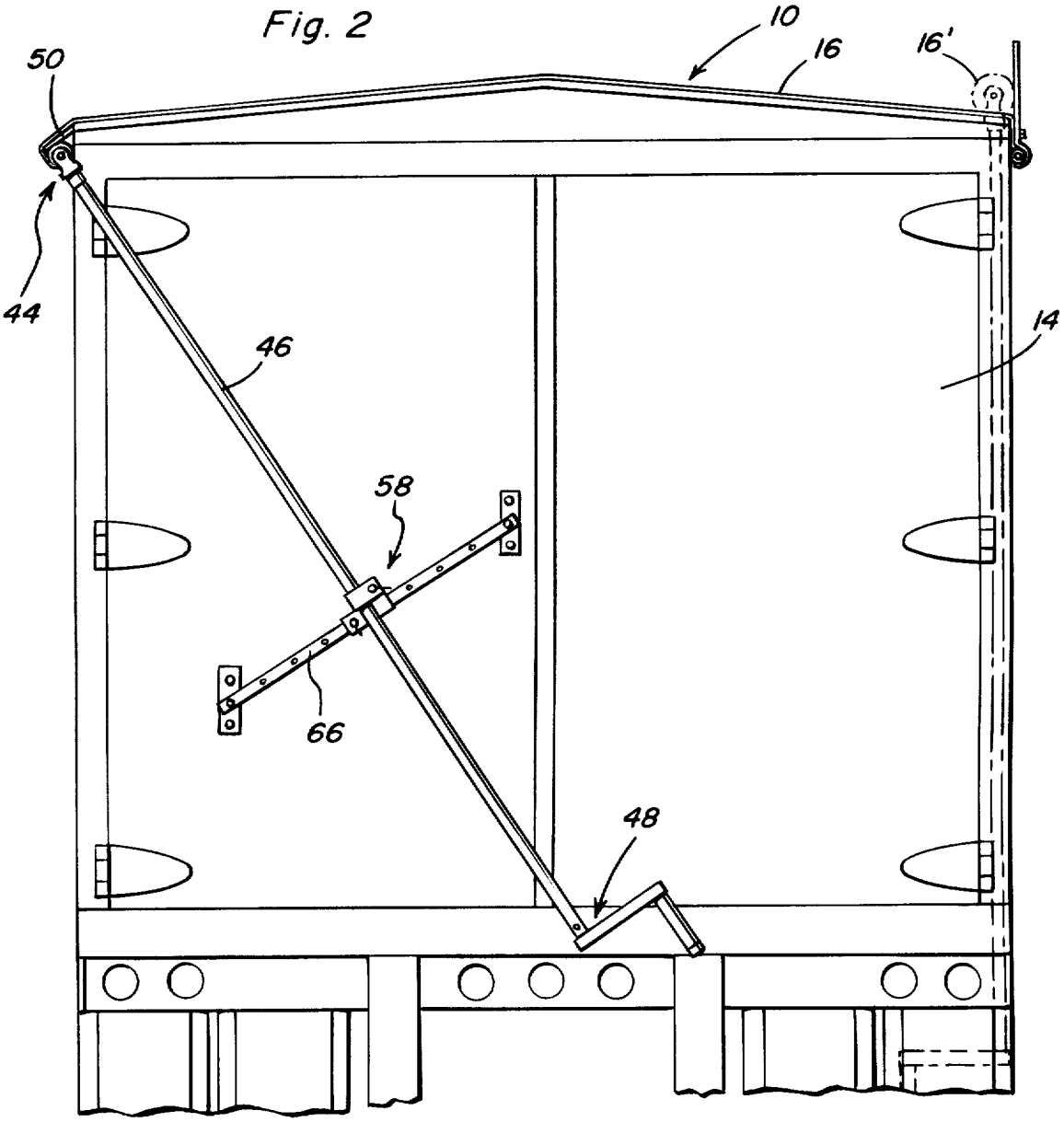
FIG. 2 is a rear elevational view of the trailer of FIG. 1.
Figure 5:
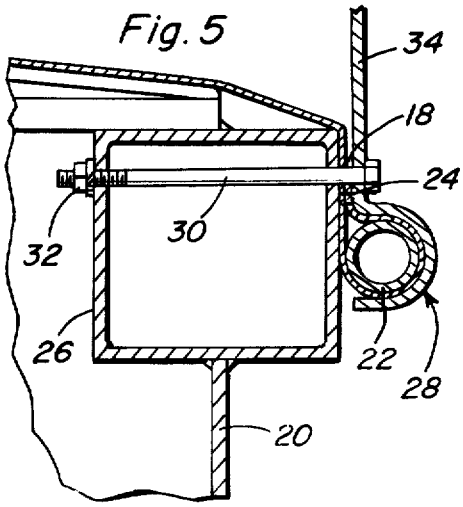
FIG. 5 is a rear elevational sectional view taken substantially along a plane passing through section line 5—5 of FIG. 3.
Figure 3:
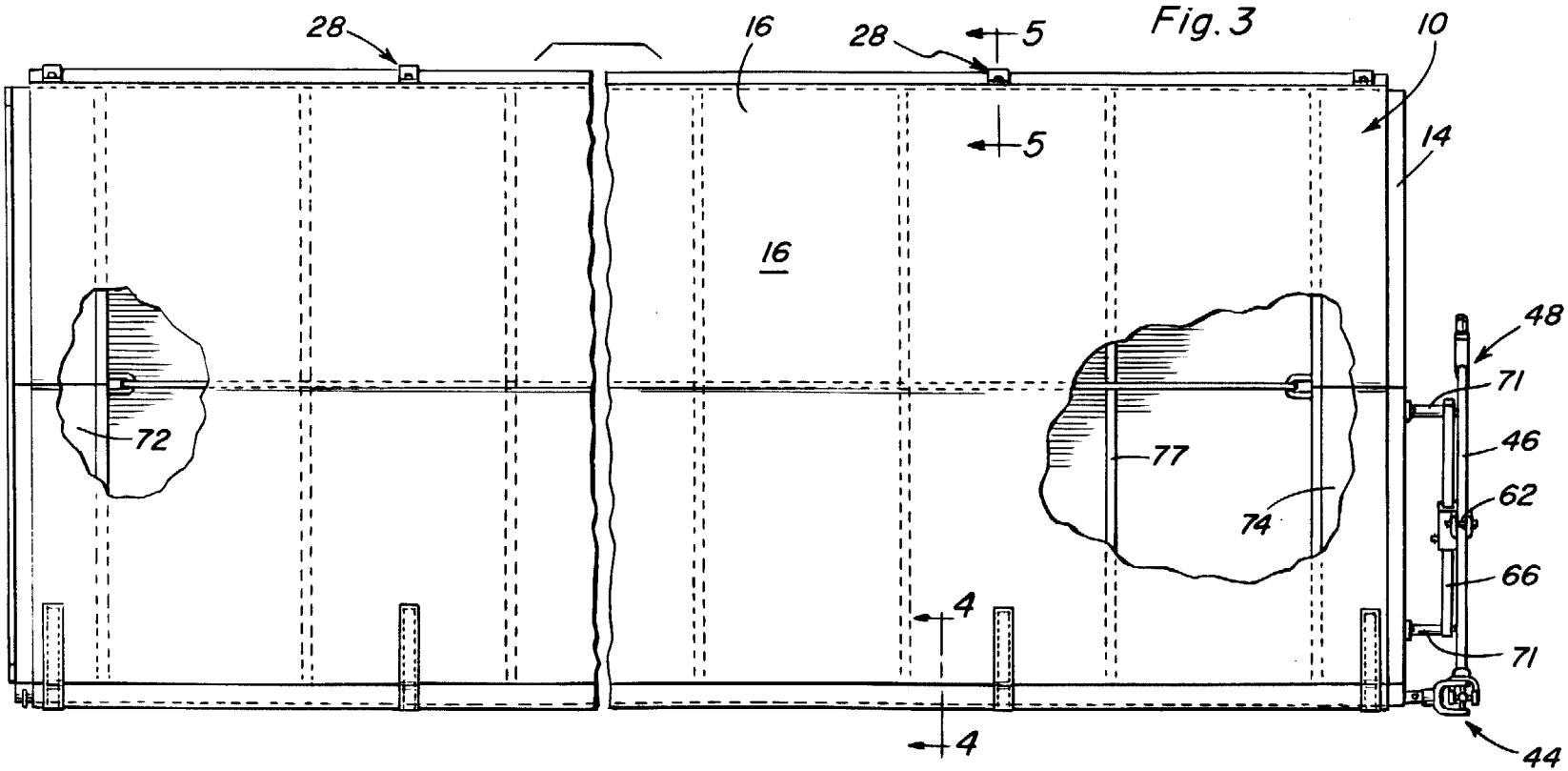
FIG. 3 is a top plan view of the trailer of FIG. 1.

With particular reference to FIGS. 1-3, it can be seen that roll-up tarp 10 is adapted for use to cover the opening 12 in the top of a trailer 14. Of course, tarp 10 can just as easily be used to cover a truck body or any other box-like stucture having an open top needing covering. Tarp 10 includes a covering material 16 which has a length approximately equal to the length of trailer 14 and a width which is slightly wider than the width of trailer 14 for reasons which will become apparent hereinafter. Covering material 16 is attached along one longitudinal edge labelled 18 to side 20 of the trailer 14. As shown most clearly in FIG. 5, this attachment is easily and quickly established through the use of tubular member 22 about which the covering material 16 is attached as by sewing or the like generally shown at 24. Tube 22 is held against frame member 26 of side 20 by use of a plurality of brackets 28. Each bracket 28 is held against frame member 26 by use of a bolt 30 which extends through the frame member and engages a nut 32. Each bracket 28 also includes an upwardly extending stop portion 34 to hold the rolled up tarp from rolling off the top of the trailer as depicted in FIG. 2 at 16'.

Figure 4:
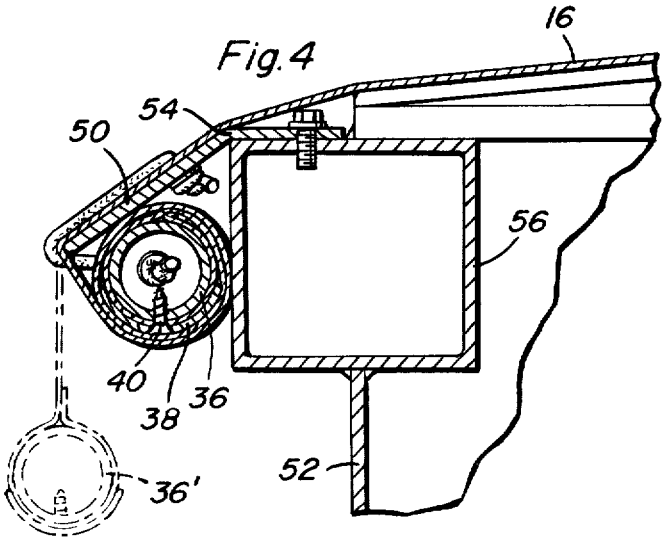
FIG. 4 is a rear elevational sectional view taken substantially along the a plane passing through section line 4—4 of FIG. 3.
Figure 8:
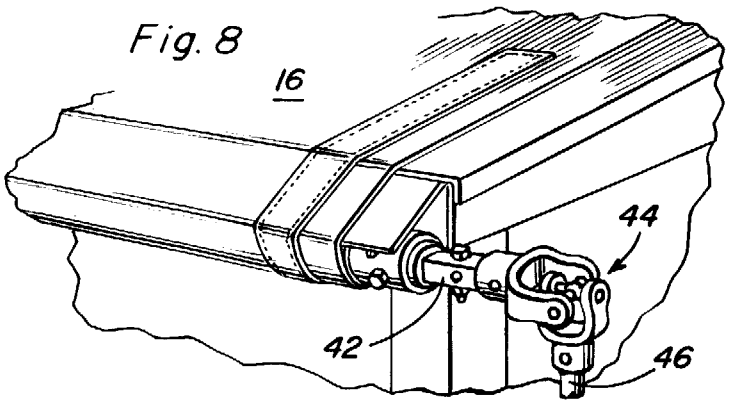
FIG. 8 is an enlarged view of the tube and the universal joint of the present invention.

A second tube member 36 is connected to the opposite end of cover material 16 by any suitable means. As shown in FIG. 4, the material extends around tube [16] *36* and is secured to itself by sewing or any other suitable attachment device. An arcuate plate 38 is then secured over the material and attached to the tube 36 by means of screws 40. In this manner, when the tube 36 is rolled, it will be apparent that material 16 will be wound thereabout. Tube 36 extends for the entire length of trailer 14 and is attached to an extension 42 which extends rearwardly of the trailer. On the opposite end of extension 42 shown in FIG. 8, there is connected one side of universal joint 44. The opposite side of universal joint 44 is attached to the shaft 46 of crank 48, shown in FIGS. 1-3. Accordingly, with the operator standing on ground level as shown in FIG. 1, the crank 48 can be turned and through universal joint 44, the covering material 16 can be wound onto or off of tube 36. Obviously, in this manner, the open top 12 can be covered or uncovered. It should also be noted that by the use of the universal joint 44 and the fact that joint 44 extends to the rear of trailer 14, the operator has the option of moving away from the rear of the trailer to rotate tube 36 or disposing the shaft 46 alongside the trailer whereat shaft 46 is approximately perpendicular to the tube 36 thus disabling universal joint 44 and locking the tube 36 in a given position. Tube 36 can be locked in a position with the material 16 rolled thereon and abutting stops 34 thus leaving the opening 12 uncovered to enable loading of the trailer 14. Alternatively, material 16 can be unrolled across the top of the trailer and over a canted lip in the form of latch plate 50 which extends laterally and downwardly from the upper edge of side 52 of the trailer. As shown in FIG. 4, lip 50 can be a steel sheet bent at 54 and bolted to structural member 56 of side 52. When the material 16 is unrolled over the top of lip 50, sufficient material is allowed for the tube to extend past the lip and dangle freely as shown in phantom at 36'. The operator then continues to roll the tube in the same direction thus causing the material to roll onto the tube in the opposite direction and the tube eventually climbs up the material and is lodged beneath the lip 50 as clearly shown in FIG. 4. An operator can continue to roll the tube in order to provide the desired tension to material 16. When the desired tension is attained, shaft 46 is again brought to a perpendicular position with respect to the tube 36. In order to hold the shaft in its final position, it can be held against the rear of the trailer by use of crank retainer assembly 58 shown most clearly in FIGS. 6 and 7. Shaft 36 can be slid into U-shaped holder 60 which has a pin 62 which can be disposed through the open end of member 60 to lock the shaft therein. Holder 60 is fixedly attached to a sleeve 64 and can be moved with that sleeve along mounting bar 66 which has a plurality of apertures such as shown at 68 formed therein. A second pin shown at 70 passes through sleeve 64 and through one of the selected apertures 68 to allow the position of sleeve 64 to be adjusted on the bar 66. Accordingly, it can be seen that in this manner the angle of shaft 46 can be varied to vary the tension of material 16 as desired. As seen in FIGS. 1 and 3, the bar 66 is mounted to the rear of trailer 14 by the use of a pair of rearwardly extending mounting members 71 which hold the bar in spaced relation to the rear of the trailer. In this manner, bar 66 can also act as a handle for one of the trailer doors.

Disposed across the front and the rear of the opening 12 are a pair of cap assemblies 72 and 74, respectively, which act as support surfaces for the tube 36 as it traverses, the trailer top rolling or unrolling the cover material 16. Assemblies 72 and 74 are raised in the middle and connected by a ridgepole 76 which supports the center of the material 16 when it is covering the trailer top and prevents longitudinal movement thereof. Also, a plurality of bows 77 are attached transversely of the opening 12 and spaced longitudinally of the trailer for supporting the material 16. The bows are connected to the ridgepole 76 and together with the ridgepole provide a framework for insuring adequate support of the covering material 16.

Figure 9:
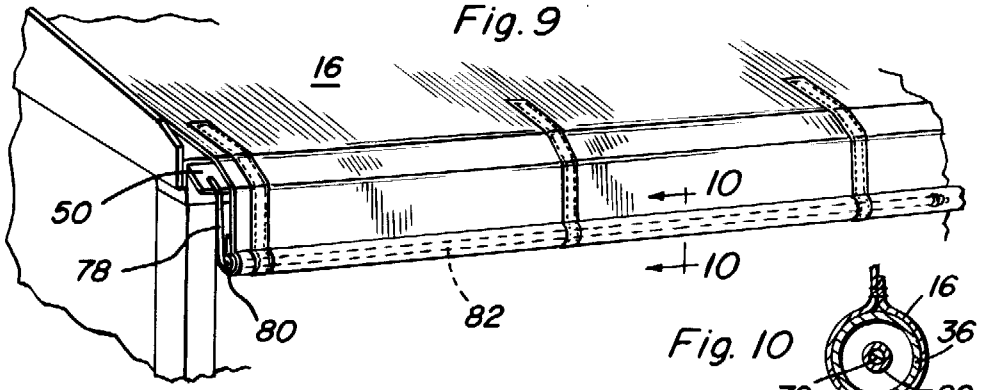
FIG. 9 is a more detailed view showing the positioning of the stretch cord of the present invention.
Figure 10:
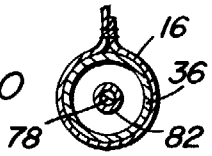
FIG. 10 is an end elevational sectional view taken substantially along a plane passing through a section line 10—10 of FIG. 9.

In order to aid in insuring a smooth, consistent unrolling of the material 16, an elastic tensioning cord 78 is attached between the forward edge of lip 50 and tube 36 as shown in FIGS. 9, 10 and 11. The cord 78 is passed downwardly through an opening formed in lip 50 and knotted to hold it in place. The opposite end of the cord is passed through a cap 80 which is disposed over the end of tube 36 and affixed thereon. Cap 80 holds a smaller tube 82, preferably made from pvc, within the large tube 36. The tube 82 should be approximately 10-12 feet in length and the cord 78 should be about 12 feet in length. The cord 78 is threaded through tube 82 and through a washer 84 and knotted at its end to keep it from sliding out of the tube. As the tarp tube 36 is unrolled, the cord 78 is fed out of cap 80 and creates 10-15 pounds of tension on the roll when it is in the stored position. This helps the roll come back over the open top 12 when desired.

In operation, starting with the tarp tube 36 wedged beneath latch plate 50, and the crank shaft 46 in its retained position in the crank retainer assembly 58, the operator removes the shaft by removing pin 62. In performing this operation, the operator has his left hand on the shaft 46 approximately 6 inches ahead of the crank handle 48. The operator's right hand is placed on the handle of the crank assembly in the operator position just to the left of the truck box while standing on the ground, as shown in FIG. 1. The operator then releases the universal joint 44 and by doing so causes the tarp tube 36 to fall from its wedged position beneath the latch plate 50 as shown at 36' in FIG. 4. The operator then begins to turn the handle in a clockwise motion causing the tarp tube 36 to roll up the covering material 16. The tube follows the back and front cap assemblies 72 and 74 along the support bows located beneath the covering material and connecting the box sides until it make contact with the stops 34.

To enclose the top of the box, the operator stands on the right-hand side holding the crank assembly in the same manner as removal. The operator now turns the crank in a counterclockwise motion and returns the tube 36 to the left-hand side of the truck box and allows it to slip over the lip 50 to the depending position 36' shown in FIG. 4. Here the operator continues to turn the crank in a counterclockwise motion causing the tarp tube 36 to roll the covering material back up and be secured beneath the latch plate. The operator then steps to the end of the truck to secure the crank shaft 46. In doing so, the universal joint 44 places tension upon the [tub] *tube* 36 causing it to be tightly secured beneath the latch plate and thereby removing the possibility that the tube 36 might dislodge itself while the truck is in motion.

It should be noted that the roll-up tarp 10 is designed to eliminate use of fasteners in securing the tarp to the sides of the truck box. Also, the roll-up tarp is self-aligning thus [eliminating] *eliminate* the need to realign the tarp each time it is used and in doing so having to crawl along the top of the truck and along its sides and then to walk completely around the truck box and tighten each fastener or rope normally used to secure the tarp. The roll-up tarp 10 further eliminates the possibility that the wind may catch the tarp where it has not been properly secured by rope or binders and allow for a uniform placement of the tarp each time it is used.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A cover assembly for an elongated body having an elongated opening, comprising:

a flexible covering material having a longitudinal dimension approximately equal to the longitudinal dimension of said opening and having a lateral dimension slightly greater than the lateral dimension of said opening, said covering material having one longitudinal edge adapted for attachment to one longitudinal edge of said opening;

a bar member attached to the other longitudinal edge of said covering material;

crank means attached to said bar member for rolling said bar member transversely of said body for rolling or unrolling said covering material; and an extension plate adapted for engagement to an opposite longitudinal edge of said opening, said plate having a surface extending away from said opening for holding said bar against said body when said bar is rolled between said surface and said body.

2. The invention as defined in claim 1 wherein said crank means includes a universal joint operatively connected on one side to said [far] *bar* member and operatively connected to a crank handle on the opposite side thereof.

3. The invention as defined in claim 2 wherein said universal joint is adapted to extend rearwardly of said body.

4. The invention as defined in claim [1] *2* and further including crank retainer assembly means adapted to be removably fixed to a portion of said body for holding said crank handle in a position substantially perpendicular to said bar thereby locking said universal joint.

5. The invention as defined in claim 4 wherein said crank retainer assembly means includes a U-shaped clip attachable to said crank handle and slide means attached to said U-shaped clip for slidably connecting said clip to said body.

6. The invention as defined in claim 2 and further including [far] *bar* movement means connected to said bar for urging said bar toward said extension plate.

7. The invention as defined in claim 6 wherein said bar movement means includes a resilient cord having one end attached to said bar.

8. The invention as defined in claim 7 wherein said bar is a hollow tube and said cord end attached to said bar extends through one end of said bar and through a smaller tube disposed in said bar and is secured to a distal end of said smaller tube.

9. The invention as defined in claim 1 and further including a plurality of bow elements adapted for connection laterally of said opening for supporting said covering material.

10. The invention as defined in claim 9 and further including a ridgepole connecting the centers of said bow members for holding said covering material against longitudinal displacement along said opening.

11. In combination, a covering apparatus for opened top bodies including a covering material connected to said body along one longitudinal side thereof; roll means for rolling said covering material laterally across said open top; and a latch plate attached along a second longitudinal [edge] *side* of said body, said latch plate being canted outwardly and downwardly from said second longitudinal edge of said body for providing an area for wedging said roll means.

12. The invention as defined in claim 11 wherein said roll means includes *a* bar fixedly attached to a second longitudinal end of said covering material; a universal joint disposed at the rear end of said bar; and a crank handle attached to said universal joint.

13. The invention as defined in claim 12 and further including crank handle retainer assembly means attached to the rear of said body for holding said crank handle in a disposition approximately perpendicular to said bar.

*14. A cover assembly for an elongated body defining an elongated opening, comprising:*

*a flexible covering material having a longitudinal dimension approximately corresponding to the longitudinal dimension of said opening and having a lateral*

*dimension greater than the lateral dimension of said opening;*

*means attaching one longitudinal edge of said covering material adjacent one longitudinal edge of said opening;*

*a bar member connected to the covering material adjacent the other longitudinal edge of the covering material;*

*crank means operatively connected to one side of said bar member for rolling said bar member transversely of said body for rolling or unrolling said covering material;*

*resilient means, one end of said resilient means being attached to said bar member on the opposite side of said bar member, the other end of said resilient means being attached to said body, said resilient means extending over said body when said covering material is in a rolled condition to expose said opening, and said resilient means applying tension to said bar member during unrolling of the covering material as said opening is being covered, and;*

*latching means supported on said body on the side of said body opposite the side defining said one longitudinal edge of said opening, said latching means serving to secure said covering material in place when said opening is covered;*

*and wherein said crank means and said resilient means cooperate to secure said covering material relative to said latching means.*

*15. The invention as defined in claim 14 including engaging means attached to said other longitudinal edge of said covering material, said crank means and resilient means operating to urge said engaging means into securing engagement with said latching means.*

*16. The invention as defined in claim 15 wherein said engaging means comprises said bar member.*

*17. The invention as defined in claim 14 wherein said crank means includes a universal joint operatively connected on one side to said bar member and operatively connected to a crank handle on the opposite side thereof.*

*18. The invention as defined in claim 17 wherein said universal joint is adapted to extend rearwardly of said body.*

*19. The invention as defined in claim 17 and further including crank retainer assembly means adapted to be removably fixed to a portion of said body for holding said crank handle in a position substantially perpendicular to said bar thereby locking said universal joint.*

*20. The invention as defined in claim 14 wherein said resilient means comprises a resilient cord, said cord extending outwardly relative to said opposite side of said bar during rolling of said covering material.*

*21. A cover assembly for an elongated body defining an elongated opening, comprising:*

*a flexible covering material having a longitudinal dimension approximately corresponding to the longitudinal dimension of said opening and having a lateral dimension greater than the lateral dimension of said opening;*

*means attaching one longitudinal edge of said covering material adjacent one longitudinal edge of said opening;*

*a bar member connected to the covering material adjacent the other longitudinal edge of the covering material;*

*crank means operatively connected to one side of said bar member for rolling said bar member transversely of said body for rolling or unrolling said covering material;*

*said crank means including an elongated operating shaft, said shaft extending downwardly from said bar member,*

*retainer means for said shaft mounted on said body for holding said shaft in position;*

*latching means supported on said body on the side of said body opposite the side defining said one longitudinal edge of said opening, said crank means operating to secure said covering material relative to said latching means to secure said covering material in place when said opening is covered,*

*and wherein subsequent movement of said shaft into holding relationship with said retainer means operates to apply tension to said bar member to tighten the bar member relative to said latching means and to thereby apply tension to said covering material.*

*22. The invention as defined in claim 21 wherein said retainer means is supported on the back wall of said body inwardly from said side of the body supporting said latching means.*

*23. The invention as defined in claim 21 wherein said crank means includes a universal joint operatively connected on one side to said bar member and operatively connected to said shaft on the opposite side thereof.*

*24. The invention as defined in claim 23 wherein said universal joint is adapted to extend rearwardly of said body.*

*25. The invention as defined in claim 23 wherein said shaft is moved to a position substantially perpendicular to said bar thereby locking said universal joint prior to movement of the shaft into holding relationship with said retainer means.*

*26. The invention as defined in claim 25 including adjustment means associated with said retainer means for varying the angle relative to the perpendicular at which said shaft is disposed across said back wall, variations of said angle serving to vary the tension applied to said covering material.*

*27. The invention as defined in claim 14 including retainer means for said crank means maintained on said body for holding said crank means in position.*

*28. The invention as defined in claim 27 wherein said retainer means is supported on the back wall of said body inwardly from said side of the body supporting said latching means.*

*29. The invention as defined in claim 27 wherein said crank means includes a universal joint operatively connected on one side to said bar member and operatively connected to said shaft on the opposite side thereof.*

*30. The invention as defined in claim 29 wherein said universal joint is adapted to extend rearwardly of said body.*

*31. The invention as defined in claim 29 wherein said shaft is moved to a position substantially perpendicular to said bar thereby locking said universal joint prior to movement of the shaft into holding relationship with said retainer means.*

*32. The invention as defined in claim 31 including adjustment means associated with said retainer means for varying the angle relative to the perpendicular at which said shaft is disposed across said back wall, variations of said angle serving to vary the tension applied to said covering material.*

* * * * *